US010452222B2

(12) United States Patent
Alphin, III et al.

(10) Patent No.: US 10,452,222 B2
(45) Date of Patent: Oct. 22, 2019

(54) COORDINATION OF SYSTEM READINESS TASKS

(71) Applicant: Microsoft Technology Licensing, LLC, Redmond, WA (US)

(72) Inventors: Thomas H. Alphin, III, Kirkland, WA (US); Samuel D. Clement, Poulsbo, WA (US); Samer F. Sawaya, Snoqualmie, WA (US); Henri-Charles Machalani, Seattle, WA (US); Ananda Sarkar, Bellevue, WA (US); Naresh Chandrasekaran, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/905,121

(22) Filed: May 29, 2013

(65) Prior Publication Data
US 2014/0359469 A1    Dec. 4, 2014

(51) Int. Cl.
*G06F 3/048* (2013.01)

(52) U.S. Cl.
CPC .................................. *G06F 3/048* (2013.01)

(58) Field of Classification Search
CPC ... G06F 3/048; G06F 3/0481; G06F 17/30867
See application file for complete search history.

(56) References Cited

U.S. PATENT DOCUMENTS

| 4,902,469 A | 2/1990 | Watson et al. |
| 5,742,778 A | 4/1998 | Hao et al. |
| 5,874,958 A | 2/1999 | Ludolph |
| 6,021,425 A | 2/2000 | Waldron, III et al. |

(Continued)

FOREIGN PATENT DOCUMENTS

| CN | 1956516 A | 5/2007 |
| CN | 101216763 | 7/2008 |

(Continued)

OTHER PUBLICATIONS

"International Search Report and Written Opinion", Application No. PCT/US2013/061079, dated Jan. 24, 2014, 10 pages.

(Continued)

*Primary Examiner* — Haoshian Shih
(74) *Attorney, Agent, or Firm* — Newport IP, LLC; Jacob P. Rohwer

(57) ABSTRACT

Various systems, such as operating systems and application suites, have multiple programs that are installed and settings that are configured in order to put the system in a desired operational state (e.g., a substantially fully functioning state). Different users can have different experiences based on different programs they use, and the set of programs they use can come from network locations. A set of system readiness tasks is created that identifies the various actions to be performed to put the system in the desired operational state. Performance of the set of system readiness tasks is coordinated to display, prior to achieving the desired operational state, a preview of a user interface of the system that is customized to a specific user of the system. Performance of the set of system readiness tasks continues, while displaying the preview of the user interface, until the desired operational state is achieved.

17 Claims, 5 Drawing Sheets

(56) References Cited

U.S. PATENT DOCUMENTS

| | | | |
|---|---|---|---|
| 6,131,121 A | 10/2000 | Mattaway et al. | |
| 6,204,847 B1 | 3/2001 | Wright | |
| 6,446,260 B1* | 9/2002 | Wilde et al. | 717/173 |
| 6,698,018 B1 | 2/2004 | Zimniewicz et al. | |
| 6,724,403 B1 | 4/2004 | Santoro et al. | |
| 6,950,991 B2 | 9/2005 | Bloomfield et al. | |
| 6,968,550 B2 | 11/2005 | Branson et al. | |
| 6,990,238 B1 | 1/2006 | Saffer et al. | |
| 7,222,078 B2 | 5/2007 | Abelow | |
| 7,290,164 B1 | 10/2007 | Harvey et al. | |
| 7,343,567 B2 | 3/2008 | Mann et al. | |
| 7,379,977 B2 | 5/2008 | Walrath | |
| 7,600,189 B2 | 10/2009 | Fujisawa | |
| 7,669,140 B2 | 2/2010 | Matthews et al. | |
| 7,673,131 B2 | 3/2010 | Azzarello et al. | |
| 7,673,255 B2 | 3/2010 | Schechter et al. | |
| 7,703,039 B2 | 4/2010 | Agarwal | |
| 7,707,514 B2 | 4/2010 | Forstall et al. | |
| 7,761,800 B2 | 7/2010 | Chaudhri et al. | |
| 7,849,453 B2 | 12/2010 | Tirumalai et al. | |
| 7,885,981 B2 | 2/2011 | Kaufman et al. | |
| 7,954,064 B2 | 5/2011 | Forstall et al. | |
| 8,060,222 B2 | 11/2011 | Eldridge et al. | |
| 8,078,970 B1 | 12/2011 | Anderson | |
| 8,121,585 B2 | 2/2012 | Commarford et al. | |
| 8,136,100 B1 | 3/2012 | Goldman | |
| 8,166,486 B2 | 4/2012 | Song et al. | |
| 8,214,802 B1* | 7/2012 | Graves | G06F 8/71 |
| | | | 715/733 |
| 8,230,417 B1 | 7/2012 | Clark et al. | |
| 8,245,934 B1 | 8/2012 | Tam et al. | |
| 8,261,253 B2 | 9/2012 | Brehm et al. | |
| 8,296,682 B2 | 10/2012 | Sloo | |
| 8,347,280 B2 | 1/2013 | Swarna | |
| 8,380,761 B2 | 2/2013 | Johnson et al. | |
| 8,392,553 B2 | 3/2013 | Petropoulakis et al. | |
| 8,484,636 B2 | 7/2013 | Mehta et al. | |
| 8,561,012 B1 | 10/2013 | Holler et al. | |
| 8,700,722 B1 | 4/2014 | Sharma et al. | |
| 8,775,917 B2 | 7/2014 | Bourke et al. | |
| 8,793,575 B1 | 7/2014 | Lattyak et al. | |
| 8,812,613 B2 | 8/2014 | Keith | |
| 8,819,025 B2 | 8/2014 | De Bona et al. | |
| 8,825,663 B2 | 9/2014 | Mahaniok et al. | |
| 8,856,670 B1 | 10/2014 | Thakur et al. | |
| 9,202,297 B1 | 12/2015 | Winters et al. | |
| 9,319,406 B2 | 4/2016 | Pardehpoosh et al. | |
| 9,514,444 B2 | 12/2016 | Moyers et al. | |
| 9,646,317 B2 | 5/2017 | John et al. | |
| 9,690,746 B1 | 6/2017 | Hosea et al. | |
| 2002/0032763 A1 | 3/2002 | Cox et al. | |
| 2002/0086706 A1 | 7/2002 | Chen et al. | |
| 2002/0090934 A1 | 7/2002 | Mitchelmore | |
| 2002/0124245 A1 | 9/2002 | Maddux et al. | |
| 2002/0147766 A1 | 10/2002 | Vanska et al. | |
| 2003/0020671 A1 | 1/2003 | Santoro et al. | |
| 2003/0055927 A1 | 3/2003 | Fischer et al. | |
| 2003/0144868 A1 | 7/2003 | MacIntyre et al. | |
| 2004/0032400 A1 | 2/2004 | Freeman et al. | |
| 2005/0075115 A1 | 4/2005 | Corneille et al. | |
| 2006/0048184 A1 | 3/2006 | Poslinski et al. | |
| 2006/0069635 A1 | 3/2006 | Ram et al. | |
| 2006/0106881 A1 | 5/2006 | Leung et al. | |
| 2006/0123413 A1* | 6/2006 | Collet et al. | 717/174 |
| 2006/0190833 A1 | 8/2006 | SanGiovanni et al. | |
| 2007/0011268 A1 | 1/2007 | Banga et al. | |
| 2007/0064984 A1 | 3/2007 | Vassa et al. | |
| 2007/0083925 A1 | 4/2007 | Hargrave et al. | |
| 2007/0101288 A1* | 5/2007 | Forstall | G06F 3/04817 |
| | | | 715/781 |
| 2007/0150886 A1 | 6/2007 | Shapiro | |
| 2007/0150891 A1 | 6/2007 | Shapiro | |
| 2007/0171450 A1 | 7/2007 | Yoshida | |
| 2007/0188494 A1 | 8/2007 | Agutter et al. | |
| 2007/0233782 A1 | 10/2007 | Tali | |
| 2007/0240150 A1* | 10/2007 | Gangwar et al. | 717/174 |
| 2008/0028389 A1 | 1/2008 | Genty et al. | |
| 2008/0120543 A1 | 5/2008 | Cahill et al. | |
| 2008/0195948 A1 | 8/2008 | Bauer | |
| 2008/0250122 A1 | 10/2008 | Zsigmond et al. | |
| 2008/0250405 A1 | 10/2008 | Farhangi et al. | |
| 2008/0301672 A1 | 12/2008 | Rao et al. | |
| 2009/0083703 A1 | 3/2009 | Grady et al. | |
| 2009/0113334 A1 | 4/2009 | Chakra et al. | |
| 2009/0124394 A1 | 5/2009 | Swarna | |
| 2009/0132942 A1 | 5/2009 | Santoro et al. | |
| 2009/0254529 A1 | 10/2009 | Goldentouch | |
| 2009/0265702 A1 | 10/2009 | Lu et al. | |
| 2009/0282146 A1* | 11/2009 | Nakano | 709/224 |
| 2009/0300544 A1 | 12/2009 | Psenka et al. | |
| 2010/0080365 A1 | 4/2010 | Seetharaman et al. | |
| 2010/0088634 A1 | 4/2010 | Tsuruta et al. | |
| 2010/0107150 A1 | 4/2010 | Kamada et al. | |
| 2010/0251187 A1 | 9/2010 | Tseng et al. | |
| 2010/0306762 A1 | 12/2010 | Lindberg et al. | |
| 2010/0325578 A1 | 12/2010 | Mital et al. | |
| 2011/0010699 A1 | 1/2011 | Cooper et al. | |
| 2011/0061010 A1 | 3/2011 | Wasko | |
| 2011/0078332 A1 | 3/2011 | Poon | |
| 2011/0117881 A1 | 5/2011 | Luoma et al. | |
| 2011/0184804 A1 | 7/2011 | Sontag et al. | |
| 2011/0225178 A1 | 9/2011 | Ingrassia et al. | |
| 2011/0251992 A1 | 10/2011 | Bethlehem et al. | |
| 2011/0258049 A1 | 10/2011 | Ramer et al. | |
| 2011/0258566 A1 | 10/2011 | Oustiougov et al. | |
| 2011/0283231 A1 | 11/2011 | Richstein et al. | |
| 2011/0302570 A1 | 12/2011 | Kurimilla et al. | |
| 2012/0004975 A1 | 1/2012 | Satyavolu et al. | |
| 2012/0032945 A1 | 2/2012 | Dare et al. | |
| 2012/0053986 A1 | 3/2012 | Cardno et al. | |
| 2012/0054653 A1 | 3/2012 | Grossman et al. | |
| 2012/0079095 A1 | 3/2012 | Evans et al. | |
| 2012/0084715 A1 | 4/2012 | Sirpal et al. | |
| 2012/0102433 A1 | 4/2012 | Falkenburg | |
| 2012/0123685 A1 | 5/2012 | Salzano | |
| 2012/0144335 A1 | 6/2012 | Abeln et al. | |
| 2012/0185842 A1* | 7/2012 | Sriperumbudur | G06F 8/61 |
| | | | 717/174 |
| 2012/0203862 A1 | 8/2012 | Tayeb et al. | |
| 2012/0218254 A1 | 8/2012 | Abeln | |
| 2012/0246137 A1 | 9/2012 | Sallakonda et al. | |
| 2012/0303756 A1 | 11/2012 | Bolohan et al. | |
| 2012/0324481 A1 | 12/2012 | Xia et al. | |
| 2013/0007662 A1 | 1/2013 | Bank et al. | |
| 2013/0018939 A1 | 1/2013 | Chawla et al. | |
| 2013/0086577 A1* | 4/2013 | Nakashima | H04N 21/25808 |
| | | | 717/178 |
| 2013/0132938 A1* | 5/2013 | Agarwal | H04W 4/21 |
| | | | 717/173 |
| 2013/0159995 A1* | 6/2013 | Senot | G06F 8/60 |
| | | | 717/178 |
| 2013/0205217 A1 | 8/2013 | Schuller | |
| 2013/0247202 A1 | 9/2013 | Yablokov | |
| 2013/0275509 A1 | 10/2013 | Micucci et al. | |
| 2013/0275553 A1 | 10/2013 | Shilo et al. | |
| 2013/0297807 A1 | 11/2013 | Chavis et al. | |
| 2013/0332846 A1 | 12/2013 | Freedman | |
| 2013/0332886 A1 | 12/2013 | Cranfill et al. | |
| 2014/0007084 A1 | 1/2014 | Ding | |
| 2014/0115116 A1 | 4/2014 | Motes et al. | |
| 2014/0201144 A1 | 7/2014 | Vibhor et al. | |
| 2014/0229436 A1 | 8/2014 | Wang et al. | |
| 2014/0229438 A1 | 8/2014 | Carriero et al. | |
| 2014/0245203 A1 | 8/2014 | Lee et al. | |
| 2014/0258350 A1 | 9/2014 | Duval et al. | |
| 2014/0287818 A1 | 9/2014 | Chan et al. | |
| 2014/0289190 A1 | 9/2014 | Chan | |
| 2014/0297771 A1 | 10/2014 | Kotamarti | |
| 2014/0298214 A1 | 10/2014 | Machalani et al. | |
| 2014/0309870 A1 | 10/2014 | Ricci et al. | |
| 2014/0359602 A1 | 12/2014 | Sawaya et al. | |
| 2015/0142983 A1 | 5/2015 | Yilmaz et al. | |

(56) References Cited

U.S. PATENT DOCUMENTS

| | | | |
|---|---|---|---|
| 2015/0244741 A1 | 8/2015 | Sinha et al. | |
| 2015/0334182 A1 | 11/2015 | Wu et al. | |
| 2017/0102930 A1 | 4/2017 | Sawaya et al. | |

FOREIGN PATENT DOCUMENTS

| | | |
|---|---|---|
| CN | 102262552 A | 11/2011 |
| CN | 102542410 A | 7/2012 |
| CN | 102693495 A | 9/2012 |
| CN | 102819461 A | 12/2012 |
| EP | 1227399 | 7/2002 |
| WO | WO-9963434 | 12/1999 |
| WO | WO-2012032137 | 3/2012 |

OTHER PUBLICATIONS

"International Search Report and Written Opinion", Application No. PCT/US2013/058666, dated Jan. 23, 2014, 11 pages.
"International Search Report and Written Opinion", Application No. PCT/US2013/060249, dated Jan. 2, 2014, 12 pages.
"iOS: How to Back Up", Retrieved from: <http://www.web.archive.org/web/20130308013457/http://support.apple.com/kb/HT1766> on Jan. 7, 2014, Feb. 20, 2013, 4 pages.
Crump, "iOS: Set Up and Restore from iCloud Backup", Retrieved from: <http://gigaom.com/2011/10/18/ios-101-set-up-and-restore-from-icloud-backup/> on Jan. 7, 2014, Oct. 18, 2011, 13 pages.
"Five Steps to Windows 7 Application Readiness", Retrieved at<<http://technet.microsoft.com/en-us/windows/gg189194.aspx#steps/>>, Retrieved Date: Mar. 4, 2013, pp. 4.
Knowlton, Gray, "Click-to-Run and Office on Demand", Retrieved at<<http://blogs.office.com/b/office-next/archive/2012/08/27/click-to-run-and-office-on-demand.aspx>>, Aug. 27, 2012, pp. 10.
"Visual Configuration and Activation", U.S. Appl. No. 13/854,025, filed Mar. 29, 2013, pp. 45.
"Application Install and Layout Syncing", U.S. Appl. No. 13/904,929, filed May 29, 2013, pp. 39.
"Optimize Windows 7 for better performance", Retrieved from <http://windows.microsoft.com/en-au/windows7/optimize-windows-7-for-better-performance> on Mar. 1, 2013, (Feb. 12, 2010), 4 Pages.
Black, Aaron "Streaming Execution Mode", Retrieved from <http://www.vmware.com/files/pdf/VMware_ThinApp_Streaming_Execution_Mode_Information_Guide.pdf> on Mar. 1, 2013, (2011), 8 pages.
Roche, Didier "OneConf in Oneiric and the way forward", Retrieved at «http://blog.didrocks.fr/post/OneConf-in-Oneiric-and-the-way-forward%E2%80%A6», (Oct. 5, 2011), 5 Pages.
Sneedon, Joey-Elijah "'Test Drive' offers install-free app try-outs in Ubuntu 11.04", Retrieved from <http://www.omgubuntu.co.uk/2011/03/test-drive-offers-install-free-app-try-outs-in-ubuntu-11-04> on Mar. 1, 2013, (Mar. 27, 2011),10 pages.
Tu, Hoang "How to Sync Apps Across Devices and How to Turn Off Windows Store", Retrieved at «http://dottech.org/91287_/windows-8-how-to-turn-off-windows-store-and-how-to-sync-apps-across-devices/> >, (Dec. 28, 2012), 4 Pages.
"Non-Final Office Action", U.S. Appl. No. 13/854,025, filed Apr. 23, 2015, 14 pages.
"Restriction Requirement", U.S. Appl. No. 13/904,929, filed Mar. 27, 2015, 6 pages.
"Final Office Action", U.S. Appl. No. 13/854,025, dated Nov. 27, 2015, 16 pages.
"Final Office Action", U.S. Appl. No. 13/904,929, filed Oct. 19, 2016, 12 pages.
"Foreign Office Action", EP Application No. 13766778.8, dated Nov. 11, 2016, 6 pages.
"Non-Final Office Action", U.S. Appl. No. 13/854,025, dated Jul. 1, 2016, 18 pages.
"Non-Final Office Action", U.S. Appl. No. 13/904,929, dated Apr. 11, 2016, 20 pages.
"Notice of Allowance", U.S. Appl. No. 13/904,929, dated Mar. 10, 2017, 12 pages.
"Final Office Action", U.S. Appl. No. 13/854,025, dated Jan. 12, 2017, 23 pages.
"Non-Final Office Action", U.S. Appl. No. 15/382,749, dated Jun. 2, 2017, 18 pages.
"Foreign Office Action", EP Application No. 13771336.8, dated May 10, 2017, 4 pages.
"Non-Final Office Action", U.S. Appl. No. 13/854,025, dated Mar. 27, 2018, 32 pages.
"First Office Action and Search Report Issued in Chinese Patent Application No. 201380076965.2", dated Feb. 5, 2018, 19 Pages.
"Foreign Office Action", CN Application No. 201380075240.1, dated Feb. 11, 2018, 11 pages.
"Foreign Office Action", EP Application No. 13766778.8, dated Sep. 29, 2017, 5 pages.
"Office Action Issued in European Patent Application No. 13766778.8", dated Jun. 1, 2018, 5 Pages.
"First Office Action and Search Report Issued in Chinese Patent Application No. 201380076987.9", dated Mar. 12, 2018, 14 Pages.
"Final Office Action issued in U.S. Appl. No. 13/854,025", dated Oct. 31, 2018, 22 Pages.
"Office Action Issued in European Patent Application No. 13783708.4", dated Nov. 16, 2018, 6 Pages.
"Second Office Action Issued in Chinese Patent Application No. 201380075240.1", dated Oct. 10, 2018, 11 Pages.
"Second Office Action Issued in Chinese Patent Application No. 201380076965.2", dated Sep. 26, 2018, 10 Pages.
"Second Office Action Issued in Chinese Patent Application No. 201380076987.9", dated Nov. 9, 2018, 8 Pages.
"Third Office Action Issued in Chinese Patent Application No. 201380076987.9", dated Feb. 22, 2019, 8 Pages.
"Office Action Issued in European Patent Application No. 13766778.8", dated Dec. 14, 2018, 5 Pages.
"Third Office Action Issued in Chinese Patent Application No. 201380075240.1", dated May 10, 2019, 29 Pages.
"Non Final Office Action Issued in U.S. Appl. No. 13/854,025", dated Jul. 11, 2019, 39 Pages.
"Office Action Issued in Chinese Patent Application No. 201380076987.9", dated Jun. 5, 2019, 6 Pages. (Translated Summary included).
"Office Action Issued in European Patent Application No. 13766778.8", dated Aug. 9, 2019, 5 Pages.

* cited by examiner

COORDINATION OF SYSTEM READINESS TASKS

BACKGROUND

As computing technology has advanced, the functionality made available to users through various programs, including computer operating systems and other applications, has increased greatly. While this increase in functionality is very helpful to users, it is not without its problems. One such problem is that given the number of different programs users may install on their devices, as well as the size of some programs, the process of setting up a computer with new programs can be time consuming. For example, when a user purchases a new computer and begins using it for the first time, he or she may have to wait for several minutes while various programs, updates to programs, and so forth are installed on the computer. Such delays can be annoying for users, leading to a poor user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple system readiness tasks to be performed to put a system of a computing device in a desired operational state are analyzed. The performance of the multiple system readiness tasks is coordinated to display a preview of a user interface of the system prior to achieving the desired operational state, the preview of the user interface being customized to a specific user of the system. This coordinating of the performance of the multiple system readiness tasks continues as user inputs to the system are received and responded to. The coordinating can include re-prioritizing system readiness tasks to align with actions the user is taking in providing the user inputs (e.g., selecting a program to run).

In accordance with one or more aspects, a computing device includes an output module and a system readiness service. The output module is configured to output a user interface display for the computing device. The system readiness service is configured to analyze multiple system readiness tasks to be performed to put each of multiple programs of a system of the computing device in a desired operational state. The service is further configured to coordinate the performance of the multiple system readiness tasks to display a preview of a user interface of the system prior to achieving a desired operational state of the system, and continue the coordinating as user inputs to the computing device are received and responded to.

BRIEF DESCRIPTION OF THE DRAWINGS

The same numbers are used throughout the drawings to reference like features.

DETAILED DESCRIPTION

Coordination of system readiness tasks is discussed herein. Various systems, such as operating systems and application suites, have multiple programs that are made ready to run (e.g., installed) and settings that are configured in order to put the system in a desired operational state (e.g., a substantially fully functioning state). A set of system readiness tasks is created that identifies the various actions to be performed to put the system in the desired operational state. Performance of the set of system readiness tasks is coordinated to display, prior to achieving the desired operational state, a preview of a user interface of the system that is customized to a specific user of the system. Performance of the set of system readiness tasks continues, while displaying the preview of the user interface, until the desired operational state is achieved.

Figure 1:
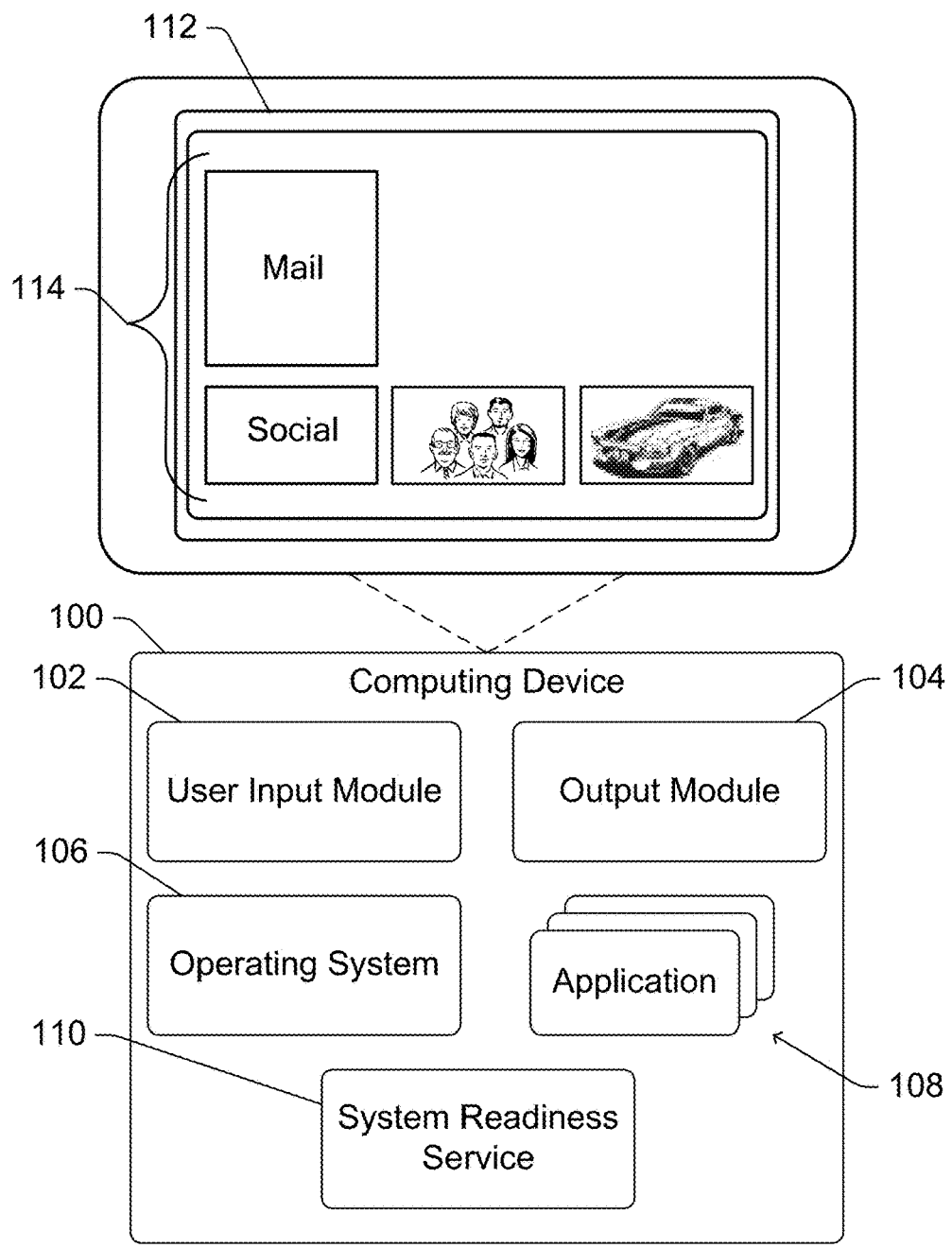
FIG. 1 is a block diagram illustrating an example computing device implementing the coordination of system readiness tasks in accordance with one or more embodiments.

FIG. 1 is a block diagram illustrating an example computing device 100 implementing the coordination of system readiness tasks in accordance with one or more embodiments. The computing device 100 can be a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, a wearable computer, and so forth. Thus, the computing device 100 may range from full resource devices with substantial memory and processor resources (e.g., personal computers, game consoles) to low-resource devices with limited memory and/or processing resources (e.g., traditional set-top boxes, hand-held game consoles).

The computing device 100 includes a user input module 102, an output module 104, an operating system 106, one or more applications 108, and a system readiness service 110.

The user input module 102 receives user inputs from a user of the computing device 100. User inputs can be provided in a variety of different manners, such as by pressing one or more keys of a keypad or keyboard of the device 100, pressing one or more keys of a controller (e.g., remote control device, mouse, track pad, etc.) of the device 100, pressing a particular portion of a touchpad or touchscreen of the device 100, making a particular gesture on a touchpad or touchscreen of the device 100, and/or making a particular gesture on a controller (e.g., remote control device, mouse, track pad, etc.) of the device 100. User inputs can also be provided via other physical feedback input to the device 100, such as tapping any portion of the device 100, an action that can be recognized by a motion detection or other component of the device 100 (such as shaking the device 100, rotating the device 100, bending or flexing the device 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules of the computing device 100. This content can be, for example, a display or playback portion of a user interface (UI) displayed by the operating system 106, by one or more applications 108, and so forth. The content can be displayed or otherwise played back by components of the computing device 100 (e.g., speakers, interactive display devices, etc.). Alternatively, the output module 104 can generate one or more signals that are output to other devices or components (e.g., speakers, display devices, etc.) that are separate from the computing device 100.

A display 112 is illustrated, which is representative of a device that is configured to output graphics for the computing device 100. Displayed on the display 112 are visuals 114, which are visual representations of functionalities, content, resources, and so forth. For example, individual ones of the visuals 114 can be associated with respective instances of the applications 108 and/or content stored on the computing device 100. User selection of an individual one of the visuals 114 can cause one of the applications 108 to be launched, an instance of the content to be presented, and so on. Thus, as discussed herein, a visual generally refers to a graphical element that is selectable to cause a variety of different actions to occur, such as launching an application, initiating playback of content, accessing a device, and so forth.

The operating system 106 includes one or more programs that manage the operation of the computing device, including the user input module 102, the output module 104, and the applications 108. The applications 108 can be executed or otherwise run by the operating system 106 and/or another application 108. Various management functionality is provided by the operating system, such as input/output support, memory management, program execution scheduling, and so forth.

The applications 108 can be a variety of different applications that provide various functionality, such as business applications (e.g., word processing applications, spreadsheet applications), entertainment applications, resource applications, and so forth. The applications 108 can be obtained from various sources, such as included with the computing device 100 when distributed, obtained from a remote source (e.g., an application store accessed via the Internet or other network), and so forth. The applications 108 can be individual applications, or alternatively can be included as part of a suite of multiple applications.

The system readiness service 110 analyzes multiple system readiness tasks to be performed to put a system in a desired operational state, and coordinates performance of the multiple system readiness tasks to display a preview of a user interface of the system prior to achieving the desired operational state. The system readiness service 110 continues coordinating performance of the multiple system readiness tasks as user inputs to the system are received and responded to. The coordination of performance of the multiple system readiness tasks is based on various rules or criteria as discussed in more detail below. The system readiness tasks are actions to be performed to put the system in the desired operational state. Various actions can be performed to put the system in the desired operational state, such as downloading programs, downloading data or settings for the programs or system, and so forth.

In one or more embodiments, the system for which the system readiness service 110 coordinates system readiness tasks is the operating system 106. Alternatively, the system readiness service 110 can coordinate system readiness tasks for other systems, such as a suite of the applications 108. For example, an application suite may include multiple applications (e.g., a word processing application, spreadsheet application, messaging application, etc.), and the system readiness service 110 can coordinate system readiness tasks for the application suite.

The desired operational state of the system refers to the system having the programs that are to be made ready to run actually ready to run, configuration values set, and so forth. For example, the desired operational state of the system can be the system being at least approximately fully functioning, being able to run the applications 108 previously requested to be made ready to run on the computing device 100. The programs to be made ready to run can include programs identified by the distributor of the computing device 100 or the operating system 106, programs identified by the user of the computing device 100 (e.g., by virtue of the user logging into a network service with a user account that is associated with programs that the user has purchased or uses), and so forth. In one or more embodiments, making a program ready to run includes installing the program, which refers to putting the program in condition to run or otherwise execute, and can include various actions, such as one or more of registering the program with an operating system, storing files in particular directories or folders, decompressing files or data, generating files or data, and so forth. Alternatively, making a program ready to run can be performed in other manners, such as putting the program in condition to run from a remote Internet location without being installed on the computing device. Thus, it should be noted that although various discussions herein refer to installing a program, the techniques discussed herein can also be used with programs that are made ready to run without being installed.

In one or more embodiments, putting the system in a desired operational state is a multi-phase process. In a first phase, a preview of a user interface of the system that is customized to a specific user of the system is obtained and displayed. The preview can be obtained in a variety of different manners, such as generated by the system readiness service 110 based on configuration data available to the service 110, obtained from a network service (e.g., a service accessed via the Internet that maintains configuration data associated with the user), and so forth. In a second phase, after the first phase, additional tasks to bring the system to the desired operational state are performed, such as downloading applications, installing applications, and so forth. Thus, the preview of the user interface is obtained and displayed prior to putting the system in the desired operational state, providing to the user a preview of the user interface customized to the user (e.g., displaying the user interface with the look and feel that the user has previously customized it with) while continuing to bring the system to the desired operational state.

It should be noted that during the process of putting the system in the desired operational state, the point at which the user interface is displayed or otherwise presented can vary. In one or more embodiments, the user interface is displayed early in the process, and changes as the preview of the user interface is generated, allowing the user to view the content of the preview as it is obtained and displayed. Alternatively, the user interface can be displayed later in the process, such as after the content of the preview is obtained and ready to be displayed to the user. Alternatively, the user interface can be displayed even later in the process, such as after the content of the preview is obtained and ready to be displayed to the user and at least some of the programs that are to be made ready to run have been made ready to run.

In one or more embodiments, putting the system in the desired operational state includes putting each of multiple programs in a desired operational state. These programs can be the applications 108 and/or programs of the operating system 106. The desired operational state of a program refers to the program being made ready to run (which may include installing the program), configuration values for the program being set, and so forth. In one or more embodiments, putting a program in a desired operational state includes various stages, such as obtaining the program (e.g., downloading the program from a service, program store, etc.), installing the program on the computing device 100, obtaining backup data (if any) for the program (such as backup data stored as associated with a user account of the user on a network service), and restoring any backup data for the program so that the backup data is available to the program.

Figure 2:
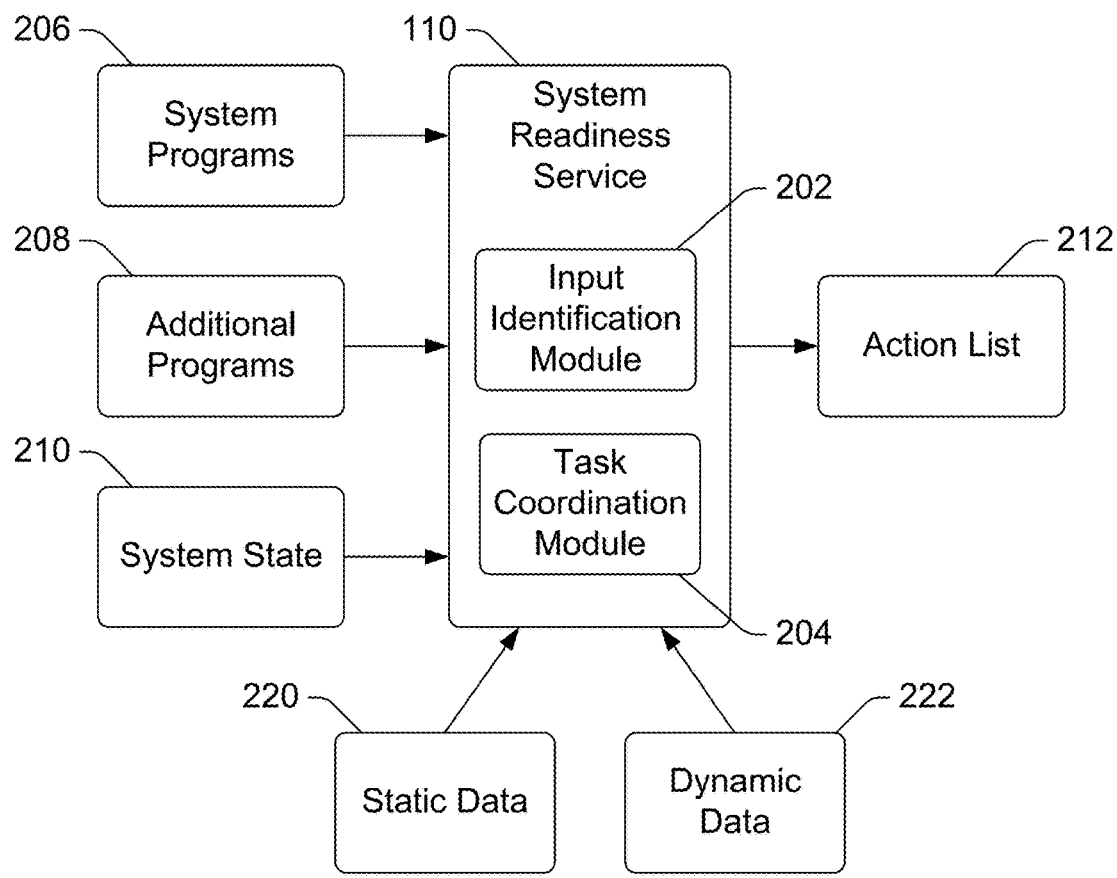
FIG. 2 is a block diagram illustrating a system that coordinates system readiness tasks in accordance with one or more embodiments.

FIG. 2 is a block diagram illustrating a system 200 that coordinates system readiness tasks in accordance with one or more embodiments. The system 200 includes a system readiness service 110 having an input identification module 202 and a task coordination module 204. The input identification module 202 receives or otherwise identifies various programs and/or data to be used in putting the system in the desired operational state. These programs and/or data can include one or more system programs 206, one or more additional programs 208, and system state 210. The system programs 206 refer to programs that are part of the system itself, such as operating system programs or modules, application suite programs or modules, and so forth. The additional programs 208 refer to programs that run on or in conjunction with the system, such as applications that run on an operating system. The system state 210 refers to various data for configuration settings of the system, such as user-specified system settings, developer-specified system settings, and so forth.

The task coordination module 204 generates, based on the programs and/or data to be used in putting the system in the desired operational state, an action list 212. The action list 212 is a record identifying the system readiness tasks to be performed to put the system in the desired operational state, as well as the order in which those system readiness tasks are to be performed. The action list 212 can take various forms, such as: a list of individual tasks to be performed for each program 206, program 208, and/or system state 210; a list of programs 206, programs 208, and/or system state 210 to be put in a desired operational state with the individual tasks to be performed for each program or system state being known to or otherwise provided to the system readiness service 110; and so forth.

In one or more embodiments, the system readiness tasks identified in the action list 212 include system readiness tasks for programs and include, for each of the system programs 206 and the additional programs 208, one or more of the following: obtaining a preview of the program, customized to a specific user of the system, for display or other presentation in a preview of a user interface of the system that is customized to a specific user of the system; obtaining the program (e.g., downloading the program from a service, program store, etc.); installing the program on the computing device; obtaining backup data (if any) for the program (such as backup data stored as associated with a user account of the user on a network service); and/or restoring any backup data for the program so that the backup data is available to the program.

In one or more embodiments, the system readiness tasks identified in the action list 212 include system readiness tasks for system state and include, for the system state 210, one or more of the following: obtaining the specified system settings; and/or configuring the system with the specified system settings.

The system programs 206, the additional programs 208, and the system state 210 can be identified in a variety of different manners. In one or more embodiments, the system readiness service 110 is configured with identifiers of at least some of the programs 206, programs 208, and/or state 210. Alternatively, the system readiness service 110 can access a remote device or service that identifies at least some of the programs 206, programs 208, and/or state 210. The programs 206, programs 208, and/or state 210 can be the same for multiple different computing devices, or alternatively different for different computing devices and/or users. For example, the system programs 206 may be the same for multiple different computing devices and be identified by a remote update service of the system distributor, and the additional programs 208 may be different for different users and be identified by a remote service that the user logs into with his or her user account.

The system readiness tasks that are included in the action list 212 can be determined in a variety of different manners. In one or more embodiments, the system readiness tasks to be performed for a program and/or system state are identified along with identifying the program and/or system state itself For example, if a remote device or service identifies the program and/or system state, then the remote device or service also identifies the system readiness tasks to be performed for the program and/or system state. Alternatively, the system readiness tasks to be performed for a program and/or system state can be identified in other manners, such as being included in the program and/or system state itself In one or more embodiments, the system readiness service 110 can also determine at least some system readiness tasks by analyzing the identified programs and/or system state. For example, if a program is identified and not already installed on the computing device, the system readiness service 110 can automatically determine that system readiness tasks for the program include downloading the program and installing the program on the computing device.

The task coordination module 204 uses static data 220 and/or dynamic data 222 in generating the action list 212. The static data 220 and/or dynamic data 222 can be used to determine the system readiness tasks to include in the action list 212, and/or an order of the system readiness tasks in the action list 212 (e.g., an order in which the system readiness tasks are to be performed). This static and/or dynamic data can describe various attributes of the system being put in the desired operational state, various attributes of the system state 210 and/or programs 206 or 208 to be used in putting the system in the desired operational state, various attributes of the device implementing the system (e.g., the computing device 100 of FIG. 1), and so forth. The static data 220 and/or dynamic data 222 can be obtained from various sources, such as from a source of programs 206, programs 208, and/or system state 210, from a source that identifies programs 206, programs 208, and/or system state 210, from other components or modules of the computing device implementing the system readiness service 110, from the programs 206, programs 208, and/or system state 210 themselves, and so forth. Examples of static and/or dynamic data that can be used by the module 204 are discussed in more detail below.

The task coordination module 204 determines the order in which system readiness tasks are to be performed by applying one or more rules or criteria based on the static data 220 and/or dynamic data 222. The order in which system readiness tasks are performed can vary, although the order of the system readiness tasks is coordinated so that the preview of the user interface for the system customized to a specific user of the system is displayed in a first phase, and more time-consuming system readiness tasks can be performed while the preview of the user interface for the system is displayed. The preview of the user interface for the system customized to a specific user of the system can be obtained from various sources. In one or more embodiments, the preview of the user interface for the system customized to a specific user is associated with a user account of the user on a network service, and the preview is obtained from the network service when the user logs into his or her user account on the network service.

Depending on the manner in which the action list 212 is implemented (e.g., as a list of individual tasks to be performed for each program 206 or 208, or a list of programs 206 or 208), the module 204 can apply one or more rules or criteria to determine the ordering of individual tasks in the action list 212, the ordering of individual programs in the action list 212, and so forth. For example, each system readiness task can be assigned a particular weight or score indicating its priority, the action list 212 can identify the priorities of each of the system readiness tasks, and the system readiness tasks can be performed at least approximately in order of their priorities. By way of another example, each program can be assigned a particular weight or score indicating its priority, the action list 212 can identify the priorities of each program, and system readiness tasks for those programs can be performed at least approximately in order of the program priorities.

In one or more embodiments, a location in the action list 212 is defined (e.g., by the task coordination module 204) at which the user interface is displayed. This location is a time, relative to the system readiness tasks, at which the user interface is displayed or otherwise presented to the user. The system is not operational to receive and respond to user input prior to this location in the action list 212 being reached by the system readiness service 110. However, once this location is reached by the system readiness service 110, at least the preview of the user interface of the system is displayed and the system is operational to receive and respond to user input. Thus, for example, if the system is an operating system of the computing device 100 of FIG. 1, a user waits to interact with (e.g., request programs be run) until this location is reached, and after this location is reached various user inputs can be provided to the computing device. This location can be, for example, the location where the system readiness tasks for obtaining previews of the programs have been obtained. By way of another example, this location can be the location where the system readiness tasks for obtaining previews of the programs have been obtained and at least some of the programs are in their desired operational state (e.g., the programs identified on a particular screen or page of the user interface, such as an initial screen or page of visuals representing programs displayed by the user interface when the user logs into or starts the computing device).

The static data 220 used by the system readiness service 110 can include various data. Examples of the static data 220 are included herein, although it should be noted that these are examples and that not all of the static data 220 discussed herein need be used by the system readiness service 110, and/or that additional static data can be used by the system readiness service 110. The static data 220 can include a list of the programs 206, a list of the programs 208, and/or a list identifying the different system state 210.

The static data 220 can also include a position of one or more visuals in a user interface, such as which screen or page of the user interface includes the visual, whether the visual is displayed in a menu or on another screen or page of the user interface, and so forth. These visuals can be, for example, representations of the programs 206 and/or 208.

The static data 220 can also include an indication as to whether a program 206 or 208, or system state 210 is to be downloaded, and if so an approximate size of the download. A program 206 or 208, or system state 210, can be downloaded from various locations, such as a service via a network (e.g., the Internet, a local area network, etc.).

The static data 220 can also include an indication of the frequency of use of various programs 206 or 208, or system state 210. The frequency of use can be per user. For example, the frequency with which a user uses a particular program can be determined when the user is logged into his or her account with a network service, and that frequency information can be provided to the system readiness services 110 if the same user account is logged into from the computing device implementing the system 200. The frequency of use can alternatively be aggregated across multiple users and/or devices, such as multiple different users accessing accounts of a network service from multiple different computing devices. The aggregated frequency of use information can optionally be filtered based on multiple criteria, such as characteristics of the computing device implementing the system 200 (e.g., the form factor of the device), characteristics of the user of the system 200, and so forth. The frequency of use of programs can be monitored by the network service in response to receiving user authorization to monitor the frequency of use of programs by the user (e.g., the user being able to opt in to or opt out of such monitoring).

The static data 220 can also include whether data used by a program 206 or 208 is obtained from another device or service via a network (e.g., the Internet). For example, for each of one or more programs 206 or 208, the static data 220 can include an indication of whether data for the program is to be obtained from another device or service via a network before the program is in the desired operational state.

The static data 220 can also include an identification of which programs 206 or 208, or system state 210, are used by multiple different programs or modules of the system 200. For example, the static data 220 can include an indication of which programs 206 or 208 participate in system-level contracts for the system 200, which programs 206 or 208 are handlers for common file types, and so forth.

The static data 220 can also include a list of programs 206 or 208 for which visuals are displayed on a lock screen of the computing device implementing the system 200. The lock screen refers to a page or screen of the computing device that is displayed while waiting for the user to authorize access to the computing device, such as by entering a personal identification number, entering a password, and so forth.

The static data 220 can also include an indication, for one or more of programs 206 or 208, of program details for the program. These program details can include, for example, whether the program is staged or not staged, the size of the program, resources accessed by the program in putting the program in its desired operational state, an approximate amount of time it takes to put the program in its desired operational state after the program is downloaded to the computing device, and so forth.

The dynamic data 222 used by the system readiness service 110 can include various data. The dynamic data 222 differs from the static data 220 in that the dynamic data 222 can change over time, including as the system is being put in its desired operational state. Examples of the dynamic data 222 are included herein, although it should be noted that these are examples and that not all of the dynamic data 222 discussed herein need be used by the system readiness service 110, and/or that additional static data can be used by the system readiness service 110.

The dynamic data 222 can include user interaction with the system 200. Various different user interaction can be included in the dynamic data 222, such as an indication of a program that a user requests to run (by providing any of a variety of different user inputs), an indication of a program that a user requests to delete from the system 200 (by providing any of a variety of different user inputs), an indication of a program that a user requests to add to the system 200 (by providing any of a variety of different user inputs), and so forth.

The dynamic data 222 can also include network status information. The network status information identifies various characteristics of a network to which the computing device implementing the system 200 is currently connected. These characteristics can include, for example, a speed of the network (e.g., data upload and/or download speeds when over the network), whether usage of the network is currently metered, whether the size of downloaded data is restricted by the network (and if so by how much), and so forth.

The dynamic data 222 can also include an indication of a current power source for the computing device implementing the system 200. For example, whether the computing device is operating in a plugged in mode (e.g., on AC power or currently being charged), or whether the computing device is operating in a battery mode (e.g., on battery power). By way of another example, if the computing device is operating in the battery mode, the dynamic data 222 can include an indication of an approximate battery life remaining for the battery.

The dynamic data 222 can also include an indication of a current load of the computing device implementing the system 200. The current load of the computing device can be, for example, a current processor or CPU usage for the computing device, a memory usage of the computing device, a network usage of the computing device, and so forth.

The dynamic data 222 can also include an indication regarding the popularity or use of each of one or more of programs 206 or 208. For example, the dynamic data 222 can include an indication of the popularity of various programs 206 or 208 in an application store from which a user can purchase or otherwise obtain programs. By way of another example, the dynamic data 222 can include an indication of which programs 206 or 208 are being mentioned most frequently in news sites on the Internet. By way of yet another example, the dynamic data 222 can include an indication of which programs 206 or 208 are mentioned (and optionally the frequency with which they are mentioned) in social networks of the user (e.g., in micro blogging networks, on pages of the user or friends of the user on a social networking service, etc.). By way of yet another example, the dynamic data 222 can include an indication of the popularity (e.g., more frequently used by other users, more frequently purchased or otherwise obtained by other users, etc.) of programs 206 or 208 for the location of the user (e.g., a geographic location of the user (such as the city or country that the computing device implementing the system readiness service 110 is located in, or a location reported by the user), a network address location such as determined by a network address assigned to the computing device implementing the system readiness service 110, etc.). By way of yet another example, the dynamic data 222 can include information regarding the user that the user chooses to share (e.g., by opting in to or out of sharing), such as the age or occupation of the user, Internet browsing habits of the user, and so forth.

It should be noted that the dynamic data 222 is not static, and thus can change over time. The dynamic data 222 can change during any phase of putting the system in its desired operational state, and thus the rules or criteria applied by the task coordination module 204 can result in different orderings over time as the dynamic data 222 changes. Thus, the order of the system readiness tasks identified by the action list 212 can change while the system is being put in its desired operational state.

The task coordination module 204 can use the static data 220 and the dynamic data 222 in a variety of different manners to generate the action list 212. In one or more embodiments, the module 204 uses a heuristic in which different attributes as identified by the static data 220 and/or the dynamic data 222 contribute to a computed weight or score for the system readiness tasks. System readiness tasks with higher weights or scores are performed prior to system readiness tasks with lower weights or scores. The amount by which different attributes contribute to the weight or score of system readiness tasks can be determined in various manners, such as being determined empirically by a developer of the system readiness service 110, being obtained from another device or service, being determined by the system readiness service 110 during operation of the system readiness service 110, combinations thereof, and so forth.

For example, system readiness tasks for more frequently used programs can be assigned higher weights or scores than system readiness tasks for less frequently used programs. These more frequently used programs can be identified based on usage patterns of the user on other computing devices, and such usage patterns aggregated into a value (e.g., a ranking from most frequently used to least frequently used) for the computing device implementing the system readiness service 110. The identification of more frequently used programs can also be based on usage patterns filtered based on computing device type. E.g., the usage of programs for devices having the same form factor (e.g., tablet, desktop computer, laptop computer, etc.) as the computing device implementing the system readiness service 110 can be aggregated into a value for the computing device implementing the system readiness service 110, and the usage of programs for computing devices having other form factors excluded from being aggregated into the value.

By way of another example, system readiness tasks to download programs that are greater than a threshold size (e.g., having greater than a threshold number of bytes to be downloaded) can be assigned lower weights or scores if the computing device is connected to a network having a download speed less than a threshold speed than if the computing device is connected to a network having a download speed greater than the threshold speed, and so forth. By way of yet another example, system readiness tasks for a program for which a user input requesting to run the program is received can be assigned higher weights or scores than system readiness tasks for other programs. By way of yet another example, system readiness tasks for system state can be assigned higher weights or scores than system readiness tasks for programs.

By way of yet another example, system readiness tasks can be prioritized based on the popularity of the programs in an application store from which a user can purchase or otherwise obtain programs. By way of yet another example, system readiness tasks can be prioritized based on which programs are being mentioned most frequently in news sites on the Internet. By way of yet another example, system readiness tasks can be prioritized based on which programs are mentioned most frequently in social networks of the user. By way of yet another example, system readiness tasks can be prioritized based on the popularity of programs at the current location of the user. By way of yet another example, system readiness tasks can be prioritized based on information regarding the user that the user has shared, such as age, occupation, Internet browsing habits and so forth.

Alternatively, the task coordination module 204 can generate the action list 212 in other manners. For example, the task coordination module 204 can generate the action list 212 based on the position of visuals in a user interface, such as which screen or page of the user interface includes the visuals. System readiness tasks for programs represented by visuals on initial or earlier pages are performed prior to system readiness tasks for programs represented by visuals on later pages. Earlier and later pages refer to pages or screens displayed as part of the user interface, where an initial page or screen is the first page or screen displayed, and then the user can step through additional pages. The order in which the user can step through the pages (e.g., by swiping his or her finger to the left or right on a touchscreen, by selecting a left or right arrow, by selecting an up or down icon, etc.) indicates earlier pages and later pages—pages or screens that the user can access when stepping through the pages or screens before accessing other pages or screens are referred to as earlier pages, and pages or screens that the user can access when stepping through the pages or screens after accessing other pages or screens are referred to as later pages.

By way of another example, the task coordination module 204 can generate the action list 212 so that system readiness tasks for obtaining previews of programs, customized to a specific user of the system, for display or other presentation in a preview of a user interface of the system that is customized to a specific user of the system are performed prior to other system readiness tasks. After the system readiness tasks for obtaining previews of programs are performed, the remaining system readiness tasks (the system readiness tasks that have not yet been performed) can be performed in various orders. For example, the remaining system readiness tasks can be performed in an order of expected speed of completion, with system readiness tasks that are expected to take smaller amounts of time to complete being performed prior to system readiness tasks that are expected to take longer amounts of time to complete.

The amount of time that a system readiness task is expected to take to complete can be determined in various manners, such as empirically by a developer of the system readiness service 110, obtained from another device or service, and so forth. For example, the expected amounts of time to complete can be based on the type of system readiness task (e.g., installing programs may take less time than obtaining programs), based on sizes of programs (e.g., programs that are larger in size (e.g., files comprising more megabytes of data, instructions, etc.) may take more time than programs that are smaller in size), and so forth. It should be noted that some system readiness tasks may be dependent on other system readiness tasks and are not performed until the system readiness tasks on which they depend have been performed regardless of the expected amount of time to complete. For example, in some situations a program is not permitted to be installed until after it has been downloaded from a service. In such situations, the system readiness task to install the program is not performed until after the system readiness task to download the program has been performed regardless of the expected amounts of time to download the program and to install the program.

The system readiness service 110 supports various different usage scenarios, allowing performance of system readiness tasks to be coordinated to display, prior to achieving the desired operational state, a preview of a user interface of the system that is customized to a specific user of the system, and then continuing to perform system readiness tasks while displaying the preview of the user interface until the desired operational state is achieved. The order in which the system readiness tasks are performed while displaying the preview of the user interface varies based on the static data 220, the dynamic data 222, and/or the implementation of the task coordination module 204.

For example, the task coordination module 204 can perform system readiness tasks so that programs for which visuals are presented on a start screen (e.g., an initial screen or page of visuals representing programs displayed by the user interface when the user logs into or starts the computing device) are put in their desired operational state before system readiness tasks for other programs are performed. By way of another example, the task coordination module 204 can perform system readiness tasks so that more frequently used programs are put in their desired operational state prior to less frequently used programs. By way of yet another example, the task coordination module 204 may determine an action list 212, but then receive a user input requesting to run a program that is not yet in its desired operational state. In response to such a user input, the module 204 can alter the action list 212 so that the program that the user has requested to run is put in its desired operational state prior to other programs (e.g., regardless of the ordering of system readiness tasks identified by the action list 212 prior to receipt of the user input).

It should be noted that in situations where a user input is user selection of a program (e.g., a user input requesting to run a program), multiple additional programs may be affected and the module 204 can alter the action list 212 so that these additional programs that are affected are put in their desired operational state prior to other programs (e.g., by re-ordering the action list 212). For example, if a user input selects an email application, the module 204 can analyze the properties of the email application and prioritize system readiness tasks for other programs that are used with the email application, such as a photo management program, a word processing program, and so forth.

It should also be noted that the speed at which the system readiness tasks are performed, including whether any pauses or breaks are taken in the performance of the system readiness tasks, can vary based on the static data 220 and/or the dynamic data 222. For example, the system readiness service 110 may keep displaying a preview of a user interface of the system without performing additional system readiness tasks indefinitely in the case of limited system resources, such as when the computing device implementing the system readiness service 110 is operating on battery power, when the computing device implementing the system readiness service 110 has no Internet access, when the computing device implementing the system readiness service 110 is accessing the Internet via a network or connection with data usage charges (e.g., a charge per megabyte or gigabyte of data transferred), and so forth. In such situations, additional system readiness tasks are not performed until the data changes (e.g., the computing device is operating in a plugged in mode rather than a battery mode) or in response to a user input requesting to use a program (in which case the action list 212 is re-ordered so that the system readiness tasks to allow the program to run are performed if possible).

Thus, the action list 212 can change in response to various events, such as a change in system environment or the dynamic data 222. This change in the action list 212 results in a re-prioritizing or re-ordering of system readiness tasks to accommodate the event. For example, system readiness tasks to run a program selected by a user input can be re-ordered to be performed before other system readiness tasks, system readiness tasks may be paused temporarily while the computing device implementing the system readiness service 110 is operating in a battery mode, and so forth.

Figure 3:
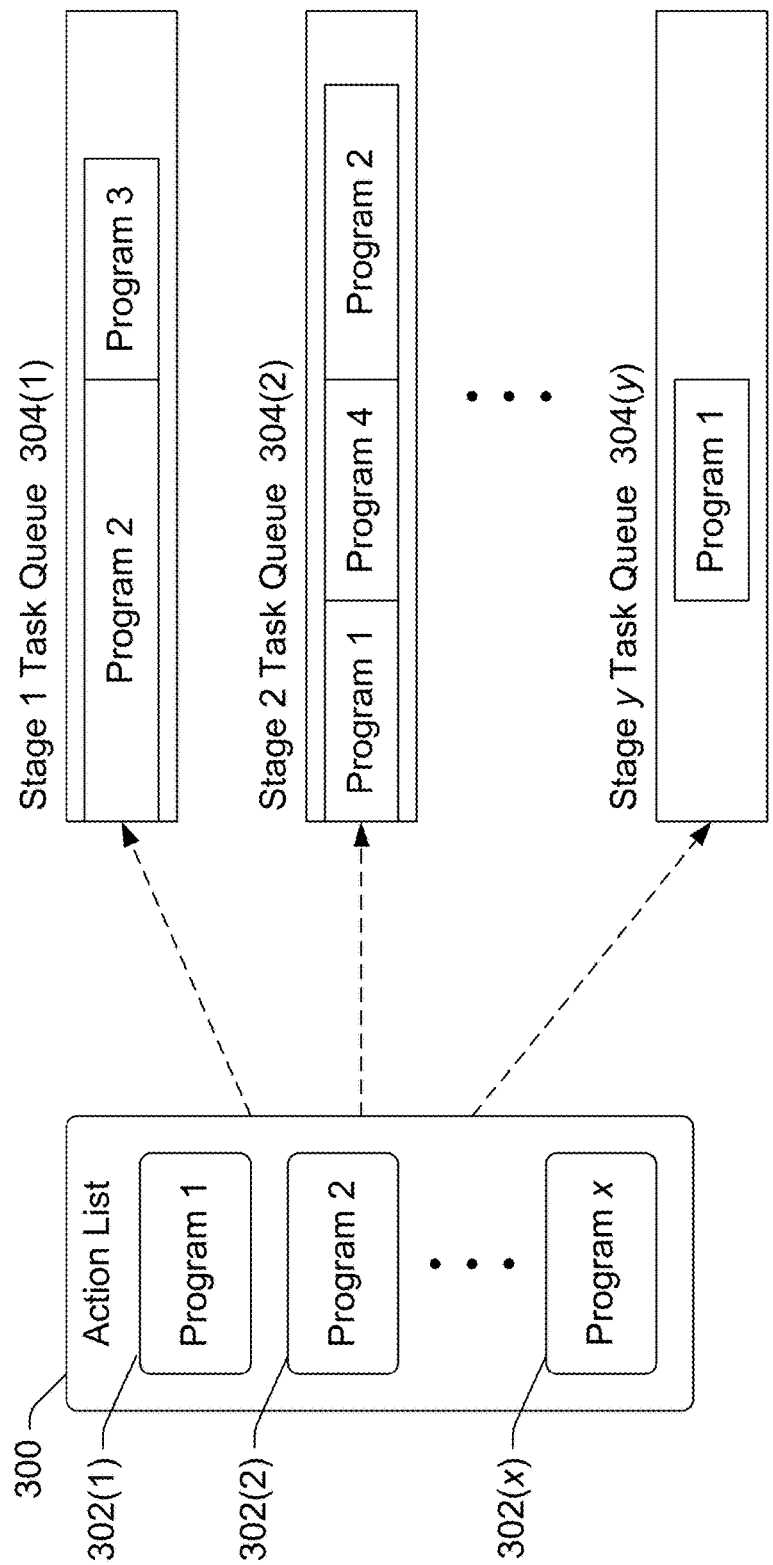
FIG. 3 illustrates an example of using an action list in accordance with one or more embodiments.

FIG. 3 illustrates an example of using an action list 300 in accordance with one or more embodiments. Action list 300 can be, for example, an action list 212 of FIG. 2. The action list 300 is a list of multiple (x) programs 302(1), . . . , 302(x), illustrated as Program 1, Program 2, . . . Program x. The programs 302(1), . . . , 302(x) are illustrated in the action list 300 in order of their priority, with Program 1 being higher priority than Program 2, Program 2 being higher priority than Program 3, and so forth. The system readiness service 110 of FIG. 1 performs the various system readiness tasks to put the programs 302(1), . . . , 302(x) in their desired operational state in order of their priority, putting higher priority programs in their desired operational state prior to lower priority programs.

Each program is put in its desired operational state in various stages, as indicated by the system readiness tasks for the program. Multiple (y) stages are illustrated as Stage 1, Stage 2, . . . , Stage y, each stage corresponding to a particular type of system readiness tasks. The system readiness tasks for the programs 302 are placed in or otherwise associated with queues associated with the multiple stages, illustrated as stage task queues 304(1), . . . , 304(y). The multiple stages can include various different stages associated with different types of system readiness tasks as discussed above, such as obtaining the program, installing the program on the computing device, obtaining backup data (if any) for the program, and restoring any backup data for the program so that the backup data is available to the program. In the illustrated example, for each program 302, system readiness tasks in Stage 1 are performed before system readiness tasks in Stage 2, system readiness tasks in Stage 2 are performed before system readiness tasks in Stage 3, and so forth.

As can be seen in FIG. 3, the system readiness task in Stage 1 for Program 2 is next to be performed (or is currently being performed), after which the system readiness task for Program 3 is to be performed. Similarly, the system readiness task in Stage 2 for Program 1 is next to be performed (or is currently being performed), after which the system readiness task for Program 4 is to be performed, after which the system readiness task for Program 2 is to be performed. Similarly, the system readiness task in Stage y for Program 1 is next to be performed.

In the illustrated example of FIG. 3, although each program may not have system readiness tasks associated with each stage, for the system readiness tasks the program does have the system readiness tasks are performed in the order of their stages. System readiness tasks at a particular stage can thus be dependent on completion of an system readiness task at a previous stage. For example, Program 2 has a system readiness task associated with Stage 1 and Stage 2, and the system readiness task associated with Stage 2 is not performed until the system readiness task associated with Stage 1 is completed.

The system readiness service 110 analyzes the system readiness tasks performed at different stages, and attempts to perform system readiness tasks of lower priority programs in holes or vacancies in the stage task queues 304 due to these dependencies. This allows for situations where the system readiness task at a particular stage for a lower priority program is performed before the system readiness task at that particular stage for a higher priority program. For example, the system readiness task associated with Stage 2 is not performed for Program 2 until the system readiness task associated with Stage 1 is completed for Program 2. Thus, the system readiness service 110 coordinates the system readiness tasks so that the system readiness task associated with Stage 2 is performed for Program 4 (which is a lower priority program than Program 2, but does not have a system readiness task associated with Stage 1) during the hole or vacancy in the stage 2 task queue between Program 1 and Program 2.

Figure 4:
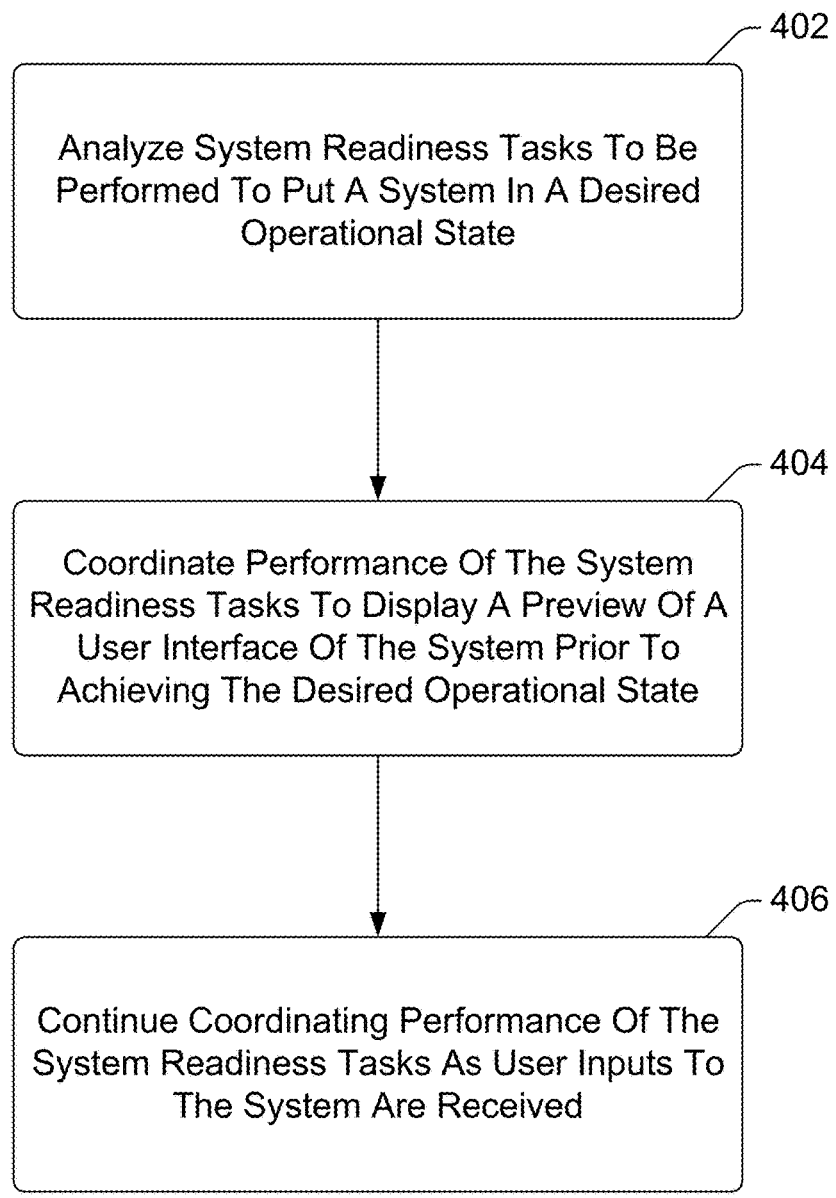
FIG. 4 is a flowchart illustrating an example process for implementing the coordination of system readiness tasks in accordance with one or more embodiments.

FIG. 4 is a flowchart illustrating an example process 400 for implementing the coordination of system readiness tasks in accordance with one or more embodiments. Process 400 is carried out by a system readiness service, such as system readiness service 110 of FIG. 1 or FIG. 2, and can be implemented in software, firmware, hardware, or combinations thereof. Process 400 is shown as a set of acts and is not limited to the order shown for performing the operations of the various acts. Process 400 is an example process for implementing the coordination of system readiness tasks; additional discussions of implementing the coordination of system readiness tasks are included herein with reference to different figures.

In process 400, system readiness tasks to be performed to put a system in a desired operational state are analyzed (act 402). This analysis includes analyzing substantially all of the system readiness tasks to be performed to put the system in the desired operational state, including the system readiness tasks to be performed to put the various programs of the system in their desired operational state. This analysis includes identifying the various system readiness tasks for the programs of the system.

The performance of the system readiness tasks are coordinated to display a preview of a user interface of the system prior to achieving the desired operational state (act 404). The preview of the user interface is customized to a specific user of the system as discussed above. The coordination of system readiness task performance includes identifying an order of performance of the system readiness tasks using various dynamic and/or static data as discussed above. This order can also change as the system is being put into its desired operational state as discussed above.

Coordination of performance of the system readiness tasks continues as user inputs to the system are received (act 406). User inputs to the system may change the order of performance of the system readiness tasks as discussed above. This coordination continues until the desired operational state of the system is achieved.

User inputs are received and responded to in act 406 by the action being requested by the user input being performed. User inputs requesting various actions can be received, such as user inputs requesting to run a program, user inputs requesting to add or delete a program, user inputs requesting to change a setting of the system (e.g., a configuration value), user inputs requesting to change the location of a visual, and so forth. The system responds to these user inputs and performs the action requested by the user. In situations in which additional system readiness tasks are to be performed before the requested action can be performed, those additional system readiness tasks are performed prior to the system performing the requested action. For example, if the user requests to run a program that is not yet in its desired operational state, the system readiness tasks for the program are performed to put the program in its desired operational state prior to running the program.

According to one or more embodiments, techniques discussed herein may be employed to determine whether a particular functionality (e.g., an application, a service, an operating system module, and so forth) is to be installed on a computing device. For instance, a functionality may be available to be installed on a computing device should a task arise that employs and/or requests the functionality. The functionality may not be installed, however, unless the functionality is expressly invoked, such as in response to a user action and/or by another functionality. Thus, a placeholder for the functionality may be maintained on a computing device to provide an indication that the functionality is available to be installed.

For example, consider a scenario where an encryption module is registered with a computing device as available to be installed. The registration may occur, for instance, as part of an initial configuration of the computing device for a particular user (e.g., putting an operating system of the computing device in a desired operational state). A system (e.g., the operating system of the computing device) may be put in its desired operational state even though the encryption module may remain in a "not installed" state unless an event occurs that invokes the encryption module. For example, a user may request that a document be transmitted in an encrypted form. In response to the request, the encryption module can be installed on the computing device such that the document can be encrypted by the installed encryption module prior to being transmitted. Thus, embodiments enable a persistent indication of availability of a functionality to be maintained on a computing device, without initiating installation of the functionality unless the functionality is expressly invoked.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
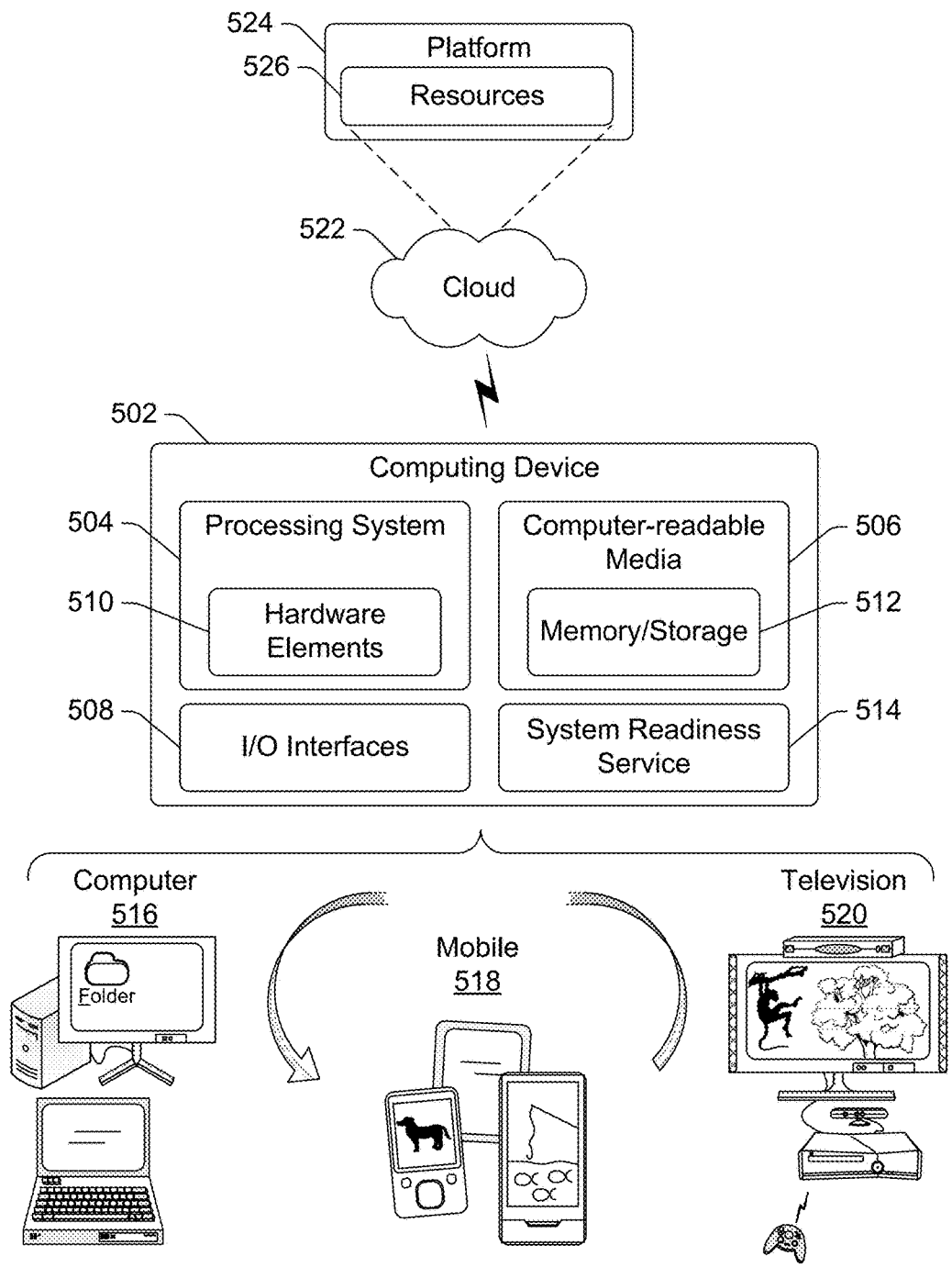
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Computing device 502 also includes a system readiness service 514. System readiness service 514 provides various functionality, including coordinating system readiness tasks to put a system in a desired operational state as discussed above. System readiness service 514 can implement, for example, system readiness service 110 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to put a system of a computing device in a desired operational state, the method comprising:
   obtaining a preview of a user interface of the system, the preview of the user interface being customized to a specific user of the system and containing multiple visuals, each of the visuals being a graphical element selectable to launch an application on the computing device;
   displaying the preview of the user interface of the system;
   analyzing the system and identifying multiple system readiness tasks to be performed to put the system in the desired operational state;
   assigning to each of the system readiness tasks a priority weighted to account for attributes of static data and/or dynamic data, the attributes including at least a usage frequency of an application for the specific user, wherein the usage frequency is aggregated across the computing device and one or more other computing devices;
   generating an action list by organizing the multiple system readiness tasks in order of the priority assigned to each of the system readiness tasks;
   performing the multiple system readiness tasks on the action list in order of the priority assigned to each of the system readiness tasks;
   receiving user input during the performing via the preview of the user interface; and
   in response to receiving the user input, continuing the performing and updating the displayed preview of the user interface of the system in accordance with the user input.

2. A method as recited in claim 1, the system comprising an operating system of the computing device.

3. A method as recited in claim 1, the multiple system readiness tasks including downloading and installing one or more programs.

4. A method as recited in claim 1, further comprising changing, in response to a change in the dynamic data, the order of the priority in which the multiple system readiness tasks are to be performed.

5. A method as recited in claim 1, further comprising defining a time during performance of the multiple system readiness tasks after which the system is operational and responsive to user input.

6. A computing device comprising:
   at least one processor and a computer-readable storage media configured to store multiple instructions that are executable by the at least one processor;
   a first subset of the multiple instructions configured to:
      output a user interface display for the computing device; and
   a second subset of the multiple instructions configured to:
      obtain a preview of a user interface of a system of the computing device, the preview of the user interface of the system being customized to a specific user of the system and containing multiple visuals, each of the visuals being a graphical element selectable to launch an application on the computing device;
      display the preview of the user interface of the system;
      analyze the system and identify multiple system readiness tasks to be performed to put the system in a desired operational state;
      assign to each of the system readiness tasks a priority weighted to account for attributes of static data and/or dynamic data, the attributes including at least:
         a usage frequency of an application;
         a popularity of an application at a current geographical location of the specific user; and
         a usage pattern for the specific user on one or more other computing devices, wherein the computing device and the one or more other computing devices are of a same form factor;
      generate an action list by organizing the multiple system readiness tasks in order of the priority assigned to each of the system readiness tasks;
      perform the multiple system readiness tasks on the action list in order of the priority assigned to each of the system readiness tasks;
      receive user input via the preview of the user interface of the system while performing the multiple system readiness tasks on the action list; and
      in response to receiving the user input, continue the performing the multiple system readiness tasks and updating the displayed preview of the user interface of the system in accordance with the user input.

7. A computing device as recited in claim 6, the system comprising an operating system of the computing device.

8. A computing device as recited in claim 6, the multiple system readiness tasks including downloading and installing one or more applications to be run on an operating system of the computing device.

9. A computing device as recited in claim 6, the multiple system readiness tasks including downloading and installing one or more programs of an operating system.

10. A computing device as recited in claim 6, the second subset of the multiple instructions being further configured to change, in response to a change in the dynamic data, the order of the priority in which the multiple system readiness tasks are to be performed.

11. A computing device as recited in claim 6, the second subset of the multiple instructions being further configured to define a time during performance of the multiple system readiness tasks after which the system is operational and the multiple visuals are displayed.

12. A method as recited in claim 1, wherein the user input is a selection of the graphical element selectable to launch the application.

13. A method as recited in claim 1, wherein the priority is further weighted to account for a download size of the application and a download speed available for downloading the application from an application store.

14. A method as recited in claim 1, wherein the priority is further weighted to account for a popularity of the application at a current geographical location of the specific user.

15. A computing device as recited in claim 6, wherein the priority is further weighted to account for a download size of the application and a download speed available for downloading the application from an application store.

16. A method as recited in claim 1, wherein the computing device and the one or more other computing devices are of a same form factor.

17. A computing device comprising:
at least one processor; and
computer-readable storage media storing instructions that, when executed by the at least one processor, cause the computing device to:
obtain a preview of a user interface of a system of the computing device, the preview of the user interface being customized to a specific user of the system and containing multiple visuals, each of the multiple visuals being a graphical element selectable to launch an application on the computing device;
display the preview of the user interface of the system;
analyze the system and identifying multiple system readiness tasks to be performed to put the system in a desired operational state;
assign to each of the system readiness tasks a priority weighted to account for attributes of at least one of static data or dynamic data, the attributes including at least a usage frequency of an application for the specific user, wherein the usage frequency is aggregated across the computing device and one or more other computing devices;
generate an action list by organizing the multiple system readiness tasks in order of the priority assigned to each of the system readiness tasks;
perform the multiple system readiness tasks on the action list in order of the priority assigned to each of the system readiness tasks;
receive user input during the performing via the preview of the user interface; and
update the displayed preview of the user interface of the system in accordance with the user input.

* * * * *